United States Patent [19]

Zimmerman et al.

[11] Patent Number: 5,169,690

[45] Date of Patent: Dec. 8, 1992

[54] FIRE RESISTANT ROOFING SYSTEM

[75] Inventors: Harold Zimmerman, Little Rock, Ark.; David Ploense, North Richland Hills, Tex.; Robert Lilleston, Downey, Calif.; Mario Butera, North Little Rock, Ark.

[73] Assignee: GS Roofing Products Company, Inc., Irving, Tex.

[21] Appl. No.: 838,567

[22] Filed: Feb. 19, 1992

Related U.S. Application Data

[62] Division of Ser. No. 499,627, Mar. 26, 1990, Pat. No. 5,100,715.

[51] Int. Cl.$^5$ .............................. B05D 3/02
[52] U.S. Cl. ............................. 427/389.8; 427/389.9; 427/443; 428/290
[58] Field of Search .............. 427/389.8, 430.1, 393.5, 427/443, 389.9; 428/147, 291, 489, 290; 524/68, 71

[56] References Cited

U.S. PATENT DOCUMENTS

| | | | |
|---|---|---|---|
| 4,137,198 | 1/1979 | Sachs | 521/154 |
| 4,368,228 | 1/1983 | Gorgati | 428/110 |
| 4,420,524 | 12/1983 | Gorgati | 428/110 |
| 4,491,617 | 1/1985 | O'Connor et al. | 428/236 |
| 4,539,254 | 9/1985 | O'Connor et al. | 521/154 |
| 4,637,946 | 1/1987 | Shah et al. | 428/63 |
| 4,659,381 | 4/1987 | Walters | 106/18.16 |
| 4,707,413 | 11/1987 | Kehr et al. | 428/440 |
| 4,719,723 | 1/1988 | Van Wagoner | 52/15 |
| 4,771,090 | 9/1988 | Kerh et al. | 524/68 |
| 4,804,696 | 2/1989 | Jolitz et al. | 524/68 |
| 4,812,349 | 3/1989 | Muelbeck | 428/138 |
| 4,824,709 | 4/1989 | Tschirch | 428/95 |
| 4,860,509 | 8/1989 | Laalay et al. | 52/173 R |

OTHER PUBLICATIONS

Modern Plastics Encyclopedia 1985-1986 p. 145.

Primary Examiner—Michael Lusignan
Attorney, Agent, or Firm—DeLio & Associates

[57] ABSTRACT

A roofing system incorporates a fire resistant asphalt composition comprising a thermoplastic elastomer modified bitumen, a filler, a brominated diphenyl ether, antimony oxide, and zinc borate. The asphalt composition is utilized with and impregnated into at least one layer of fiberglass or polyester mat. Preferably at least two layers are utilized wherein an upper layer is a fiberglass mat and a lower layer is a polyester mat, both mat layers being impregnated with the composition. In its preferred formulation, the asphalt composition comprises, in weight percent, about 30% to 90% bitumen, about 4% to 16% styrene-butadiene-styrene copolymer, about 10% to 40% filler, and up to about 20% each of the brominated diphenyl ether, the antimony oxide, and the zinc borate. The preferred brominated diphenyl ether is decabromodiphenyl ether.

20 Claims, No Drawings

FIRE RESISTANT ROOFING SYSTEM

This is a division of co-pending application Ser. No. 499,627 filed on Mar. 26, 1990, now U.S. Pat. No. 5,100,715.

BACKGROUND OF THE INVENTION

This invention relates to a fire resistant asphalt composition and, in particular, to an asphalt composition which is incorporated into a fire resistant roofing system.

The prior art is replete with fire resistant roofing systems which incorporate bituminous asphalt compositions. Some of these roofing systems may utilize one or more layers of fiberglass, polyester or other mats into which may be incorporated an asphalt composition. This type of construction is disclosed in Gorgati U.S. Pat. No(s). 4,420,524 and 4,638,228 in which a three layer roofing membrane comprises an upper fiberglass mat, a fiberglass net and a polyester mat layer, each layer being impregnated with a bitumen mixture which includes a thermoplastic polymer. Other patents have disclosed various fire-retardant asphalt compositions for use in roofing applications such as Jolitz et al U.S. Pat. No. 4,804,696 and Walters U.S. Pat. No. 4,659,381, the latter incorporating a halogenated flame retardant such as decabromodiphenyl oxide, an inorganic phosphorus compound, and a metal oxide hydrate such as zinc borate hydrate.

Ideally, asphalt based roofing systems will have membranes of one or more layers into which is added a waterproofing, fire resistant composition such as a bitumen based asphalt. The amount of any additives providing the fire resisting characteristics should be minimized to reduce costs while still permitting the roofing system to meet Underwriters Laboratories standard UL 790, class A. In addition to being fire resistant, the membrane system should have high strength and stability for long life, and should be easily manufactured at reasonable cost. While prior art roofing systems have attempted to meet these criteria, commercially available roofing systems have been inadequate in one or more areas.

Bearing in mind the problems and deficiencies of the prior art, it is therefore an object of the present invention to provide a waterproofing membrane system for roofing and other building applications which has good fire resistant characteristics.

It is another object of the present invention to provide a fire resistant bitumen based asphalt composition for incorporation into the membranes of a roofing system.

It is a further object of the present invention to provide a fire resistant asphalt composition in which the fire resisting additives make up a relatively low percentage of the asphalt It is yet another object of the present invention to provide a fire resistant roofing system which minimizes the number of substrates or membranes necessary to result in good performance It is a further object of the present invention to provide a fire resistant roofing membrane system which meets the above objects and which is easy to manufacture and reasonable in cost.

SUMMARY OF THE INVENTION

The above and other objects, which will be apparent to those skilled in the art, are provided in the present invention which provides a fire resistant roofing asphalt composition comprising a thermoplastic elastomer modified bitumen, a filler, a brominated diphenyl ether, antimony oxide, and zinc borate. The asphalt composition is utilized with and impregnated into at least one layer of fiberglass or polyester mat. For better performance at least two layers are utilized wherein the upper layer is a fiberglass mat and a lower layer is a polyester mat, both mat layers being impregnated with the composition.

In its preferred formulation, the asphalt composition comprises, in weight percent of the total, about 30% to 90% bitumen, about 4% to 16% styrene-butadiene-styrene copolymer, about 10% to 40% filler, and up to about 20% each of the brominated diphenyl ether, the antimony oxide, and the zinc borate.

The method aspect of the present invention comprises impregnating at least one layer of fiberglass or polyester mat with the asphalt composition described above to produce a fire resistant waterproofing membrane

DETAILED DESCRIPTION OF THE INVENTION

Bitumen is a solid to viscous, semi-solid liquid mixture of hydrocarbons which may be obtained from petroleum by distillation of the lighter hydrocarbons. Bitumen is usually considered to be a major constituent of asphalt, although in many instances the terms "asphalt" and "bitumen" may be used interchangeably. The asphalt or bitumen used in the present invention preferably has a softening point of 90-130° F. by the conventional standard ring and ball softening test. The bitumen used in the present invention should be modified by incorporating a thermoplastic elastomer such as styrene-butadiene-styrene copolymer, styrene-ethylene-butadiene-styrene copolymer, styrene-isoprene-styrene copolymer, amorphous ethylene/propylene copolymers, atactic polypropylene, polyisobutylene, neoprene, chloroprene, ethylene propylene dimer, or reclaimed rubber. Preferably, a styrene-butadiene-styrene block copolymer is utilized.

Along with the thermoplastic elastomer modified bitumen, a filler material may be incorporated to modify the properties of the asphalt. Fillers such as limestone (calcium carbonate), when added as in comminuted form, may add weight or bulk, improve strength, or modify other properties, as well know in the art. In place of limestone, any other suitable mineral dust filler may be utilized.

The bitumen portion typically comprises, in weight percent, from about 30% to about 90% of the total asphalt composition of the present invention. The thermoplastic elastomer may be typically added in amounts from about 4 to about 16 weight percent of the total. When employed, the mineral dust or other filler comprises about 10 to about 40 weight percent of the total composition.

To provide fire resistant properties to both the asphalt composition and the finished membrane incorporating the asphalt composition, there is employed a mixture of a brominated diphenyl ether, antimony oxide, and zinc borate. It is preferred that each component comprise no more than about 20 weight percent of the total composition, and the relative amount of each may be modified as desired. More preferably, the brominated diphenyl ether is employed in a range of about 0.5 to 10 weight percent, and the antimony oxide and zinc borate are each employed in amount of about 0.5 to 5.0 weight percent of the composition.

The preferred brominated diphenyl ether is decabromodiphenyl ether, also known as decabromodiphenyl oxide. Less preferred are other lower brominated diphenyl ethers. It is preferred that the total of the mixture of the brominated diphenyl ether, antimony oxide and zinc borate comprise no more than about 10 weight percent of the final asphalt composition of the present invention.

In addition to the aforementioned components, other conventional additives may also be utilized in the present invention such as plasticizers and other modifiers to impart specific properties to the asphalt composition.

The roofing membrane substrate layers employed in the present invention are one or more mats of fiberglass or polyester. The fiberglass mat may be woven or non-woven while the polyester mat is preferably non-woven. Additionally, various weights and thicknesses may be used. For example, the fiberglass mat may have a weight of 0.9 to 4.0 lbs. per 100 sq. feet and the polyester mat may have a weight of from 1 to 5 lbs. per 100 sq. feet.

For better durability and flame resistance, it is preferred that at least two of the aforementioned mat layers be employed, with the fiberglass mat being the uppermost layer as the completed membrane is to be applied to the roof or other exterior portion of a building. The polyester mat is preferably placed below the fiberglass mat, either directly adjacent to and contacting the fiberglass mat, or with some other intervening layer. Additional membrane substrate layers may be employed in addition to the fiberglass and polyester mat layers described above. The use of polyester mat alone impregnated with the asphalt composition of the present invention is less preferred because it does not have optimum fire retardant characteristics, although it might be useful in some instances.

At least one of the membrane layers, and preferably both, are impregnated with the asphalt composition of the present invention. Where additional membrane or substrate layers are employed, these may also be impregnated with the asphalt composition.

The following table illustrates typical compositions and descriptions of the asphalt composition and substrates utilized in the present invention:

| Asphalt composition | Wt. % |
| --- | --- |
| Bitumen | 64 |
| Limestone dust | 19 |
| Styrene-butadiene-styrene copolymer | 8 |
| Decabromodiphenyl ether* | 5 |
| Antimony Oxide | 2 |
| Zinc Borate | 2 |

| Substrate Layers | Weight |
| --- | --- |
| Fiberglass non woven mat | 2.2 lbs/100 ft² |
| Polyester non woven mat | 2.9 lbs/100 ft² |

*DE-83 available from Great Lakes Chemical Corp.

The asphalt composition is produced by blending the thermoplastic elastomer with the bitumen at elevated temperatures and thereafter adding the brominated diphenyl ether, antimony oxide and zinc borate. The filler material may be added at any point in the blending process. All solid materials should be comminuted and added as a finely divided powder. The composition should be blended until the components are mixed thoroughly.

The asphalt composition of the present invention may be impregnated into the membrane substrate layers by conventional processes in which the substrates are immersed in a bath of the composition at elevated temperature in a continuous process. Where multiple substrate layers are employed, the asphalt composition may be impregnated either before or after the layers are brought together. The impregnated layer(s) may then be surfaced on one or both sides with conventional mineral surfacing.

The completed fire resistant waterproofing membrane may be applied to a building roof or other exterior surface by conventional techniques. These include the "hot mopping" method where a heated asphalt is employed as an adhesive to secure the membrane. Additionally, other methods can be utilized to secure the finished membrane, such as by use of fasteners and the like.

When produced and properly installed in accordance with the above, a fiberglass mat (top layer)/polyester mat (bottom layer) membrane, each impregnated with the preferred asphalt composition of the present invention, have excellent fire retardant characteristics. Thus, the present invention provides an effective, easy to manufacture fire retardant asphalt composition and roofing membrane system in accordance with the aforestated objects. The relatively low amount of fire retardant components enables the invention to be produced at reasonable cost and on conventional equipment.

While this invention has been described with reference to specific embodiments, it will be recognized by those skilled in the art that variations are possible without departing from the spirit and scope of the invention, and that it is intended to cover all changes and modifications of the invention disclosed for the purposes of illustration which do not constitute departure from the spirit and scope of the invention.

Having thus described the invention, what is claimed is:

1. A method of producing a fire resistant waterproofing membrane having a layer of fiberglass mat and a layer of polyester mat comprising impregnating said mats with a composition consisting essentially of:
   a thermoplastic elastomer modified bitumen;
   a filler; and
   no greater than about 10 percent by weight of a fire retardant consisting essentially of:
   a brominated diphenyl ether;
   antimony oxide; and
   zinc borate.

2. The method of claim 1 wherein said brominated diphenyl ether comprises decabromodiphenyl ether.

3. The method of claim 1 wherein said composition comprises, in weight percent, about 30–90% bitumen, about 10–40% filler, about 5% brominated diphenyl ether, about 2% antimony oxide; and about 2% zinc borate.

4. The method of claim 1 wherein said filler comprises a mineral dust.

5. The method of claim 1 wherein said thermoplastic elastomer comprises a styrene-butadiene-styrene copolymer.

6. The method of claim 5 wherein said brominated diphenyl ether comprises decabromodiphenyl ether.

7. A method of producing a fire resistant roofing membrane having an upper layer of fiberglass mat and a layer of polyester mat adjacent to said fiberglass mat comprising impregnating each of said mats being with a composition consisting essentially of:
- a thermoplastic elastomer modified bitumen;
- filler; and
- a fire retardant consisting essentially of, in weight percent of said composition:
  - about 0.5-10% of a brominated diphenyl ether;
  - about 0.5-5% of antimony oxide; and
  - about 0.5-5% of zinc borate.

8. The method of claim 7 wherein said brominated diphenyl ether comprises decabromodiphenyl ether.

9. The method of claim 7 wherein said composition comprises, in weight percent, about 30-90% bitumen, about 10-40% filler, about 5% brominated diphenyl ether, about 2% antimony oxide; and about 2% zinc borate.

10. The method of claim 7 wherein said filler comprises a mineral dust.

11. The method of claim 7 wherein said thermoplastic elastomer comprises a styrene-butadiene-styrene copolymer.

12. The method of claim 11 wherein said brominated diphenyl ether comprises decabromodiphenyl ether.

13. The method of claim 12 wherein said fire retardant is present in an amount no greater than about 10% by weight of said composition.

14. A method of producing a fire resistant roofing membrane comprising the steps of:

a) preparing a composition consisting essentially of:
- a thermoplastic elastomer modified bitumen;
- filler; and
- a fire retardant consisting essentially of, in weight percent of said composition:
  - about 0.5-10% of a brominated diphenyl ether;
  - about 0.5-5% of antimony oxide; and
  - about 0.5-5% of zinc borate;

b) impregnating said composition into and bringing together an upper layer of fiberglass mat and a layer of polyester mat.

15. The method of claim 14 wherein said brominated diphenyl ether comprises decabromodiphenyl ether.

16. The method of claim 14 wherein said composition comprises, in weight percent, about 30-90% bitumen, about 10-40% filler, about 5% brominated diphenyl ether, about 2% antimony oxide; and about 2% zinc borate.

17. The method of claim 14 wherein said filler comprises a mineral dust.

18. The method of claim 14 wherein said thermoplastic elastomer comprises a styrene-butadiene-styrene copolymer.

19. The method of claim 18 wherein said brominated diphenyl ether comprises decabromodiphenyl ether.

20. The method of claim 19 wherein said fire retardant is present in an amount no greater than about 10% by weight of said composition.

* * * * *